Feb. 7, 1939.   L. LEE   2,146,122
CIRCULATION OF AIR FOR HEATING
Filed Dec. 12, 1935   5 Sheets-Sheet 1

INVENTOR
Leif Lee
by Stebbins, Blenko & Parmelee
his attorneys

Feb. 7, 1939.   L. LEE   2,146,122
CIRCULATION OF AIR FOR HEATING
Filed Dec. 12, 1935   5 Sheets-Sheet 2
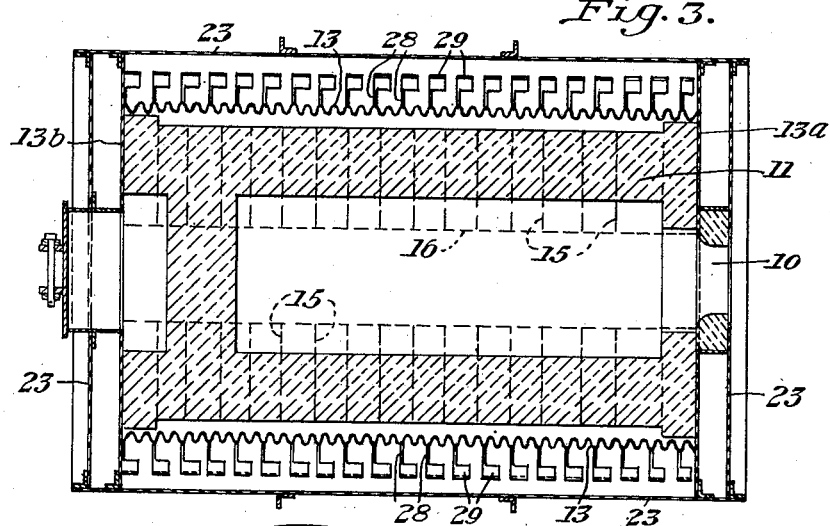
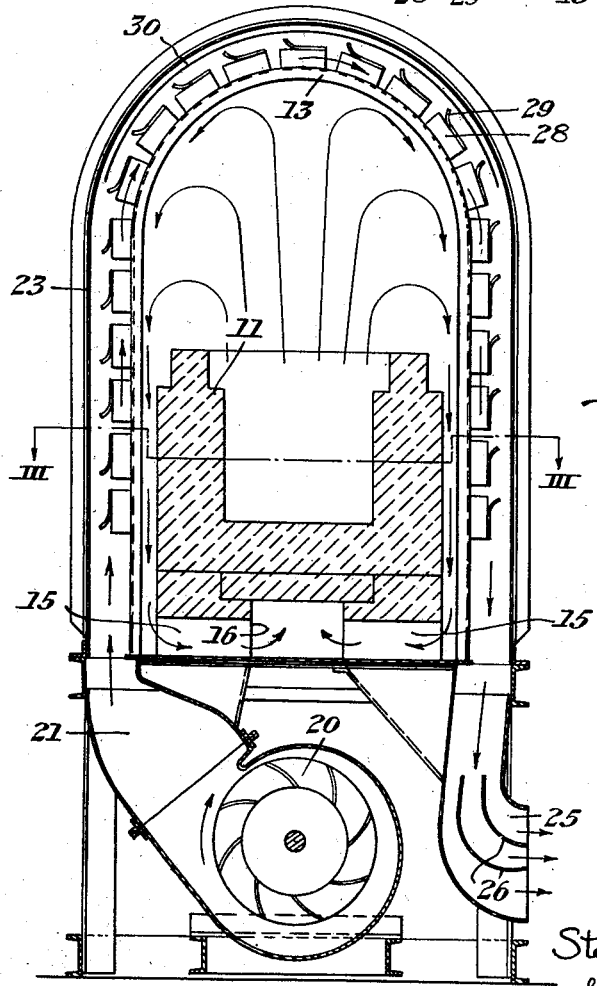
INVENTOR.
Leif Lee
by Stebbins, Blenko & Parmelee
his attorneys

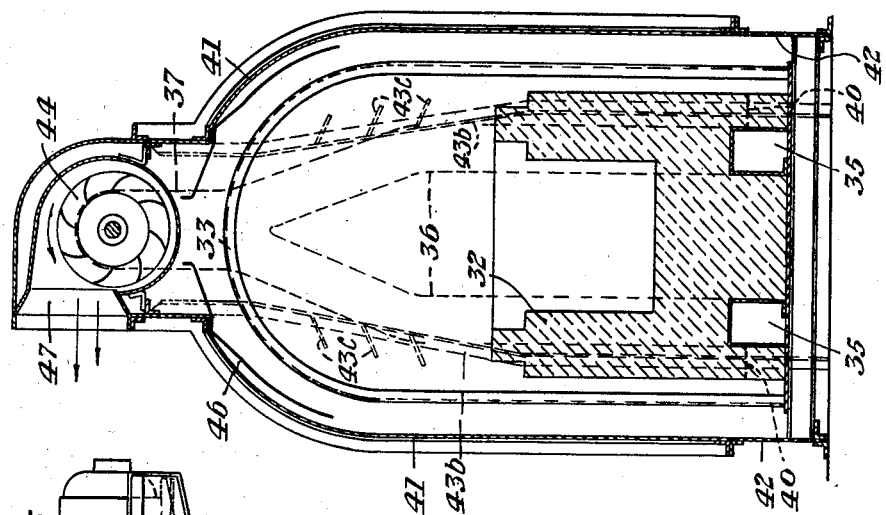

Feb. 7, 1939.  L. LEE  2,146,122
CIRCULATION OF AIR FOR HEATING
Filed Dec. 12, 1935    5 Sheets-Sheet 4
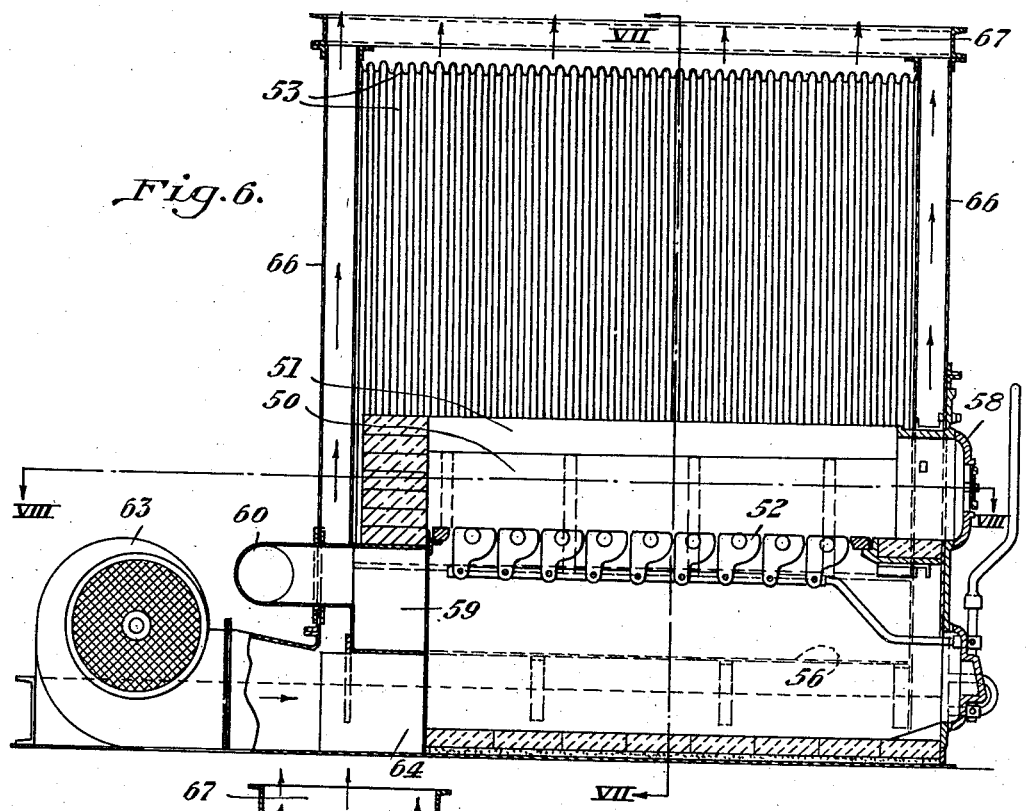
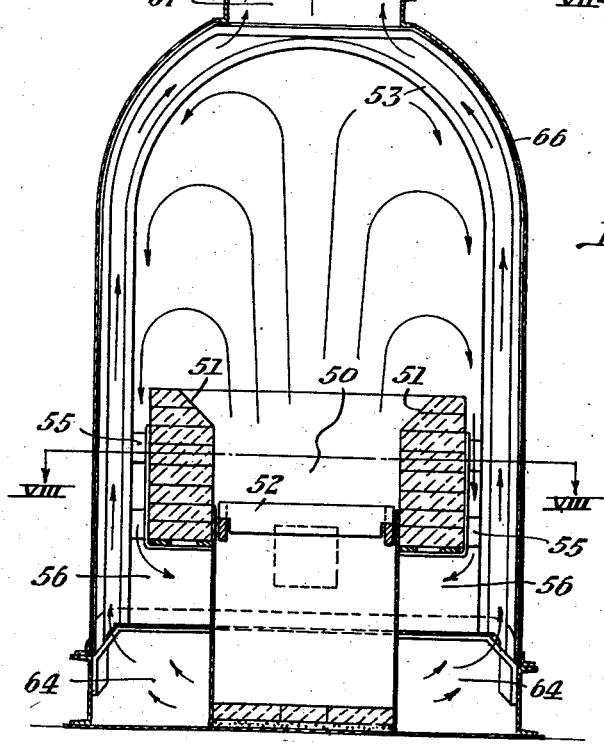
INVENTOR
Leif Lee
by Stebbins, Blenko & Parmelee
his attorneys Feb. 7, 1939.    L. LEE    2,146,122
CIRCULATION OF AIR FOR HEATING
Filed Dec. 12, 1935    5 Sheets-Sheet 5

INVENTOR
Leif Lee
by
Stebbins, Blenko & Parmelee
his attorneys

Patented Feb. 7, 1939

2,146,122

UNITED STATES PATENT OFFICE 2,146,122

CIRCULATION OF AIR FOR HEATING

Leif Lee, Youngstown, Ohio; Halfdan Lee executor of the estate of said Leif Lee, deceased Application December 12, 1935, Serial No. 54,083

5 Claims. (Cl. 126—110)

The present invention relates to the passage of air through a heating furnace, and more particularly to an arrangement for so directing and confining the moving air currents as to effect the maximum absorption of heat by these air currents from the available source.

This application is a continuation-in-part of application Serial No. 540,854, filed May 29, 1931.

I have provided an improved arrangement for circulating air through a heating furnace, so as to bring about increased efficiency in heating the air in accordance with my invention. In the first place, it is important in a heating furnace for the production of hot air that the chamber containing the source of heat have walls constituting heat transfer surfaces which are effective for the maximum transfer of heat. I have discovered that it is important furthermore that the air to be heated sweep over these heat transfer surfaces in such intimate contact that maximum efficiency in absorption of heat by the air is accomplished.

Accordingly, it is one of the objects of the present invention to provide an air heating furnace constructed and arranged not only for a maximum heat transfer surface, but also for the uniform distribution of the products of combustion for heating purposes on one side of said surface and the efficient circulation of air over the other side of said surface.

A furnace in accordance with the present invention is also characterized by a maximum surface effective as a direct radiant heat absorbing surface with respect to the fuel bed.

In furtherance of the foregoing, it is also an object of the invention to provide a control such that a uniform distribution of the heating medium is obtained.

A further object of the present invention is to provide a structure of the character referred to capable of being produced at a minimum cost and of such compact construction as to permit wide-spread use thereof for heating purposes.

In the drawings which illustrate my invention,

Fig. 2 is a sectional view on the line II—II of Fig. 1;

Fig. 3 is a sectional view on the line III—III of Figs. 1 and 2;

Fig. 4 is a view in elevation similar to Fig. 1 of a modified form of construction embodying my invention;

Fig. 5 is a sectional view taken on the line V—V of Fig. 4;

Fig. 6 is a view principally in central vertical section of a further modification of apparatus embodying my invention;

Fig. 7 is a transverse vertical section on the line VII—VII of Fig. 6; and

As the inner casing is of relatively light gauge metal, it is not shown cross hatched in any of the figures, but is indicated by a heavy black line in the sectional views.

From one point of view, the most efficient air heater would be theoretically one in which the combustion gases exhausted from the furnace were reduced most nearly to room temperature. Undoubtedly, if no limit were placed on the expense involved, a designer could so arrange heat transfer surfaces as to reduce to practically room temperature the combustion gases exhausted from the furnace. From the point of view of economy, however, the size of the heating unit should be reduced to the minimum; and in accord with this I have provided for rapid flow of air in properly distributed streams in intimate contact with the heat exchange surface. The air is but little heated except by wiping contact and, consequently, to remove the heat from the heat exchange surfaces I employ thin streams uniformly distributed over those surfaces. In this connection I have found it important to arrange the intake for the air and the discharge of the heated air so as to further these ends.

Figure 1:
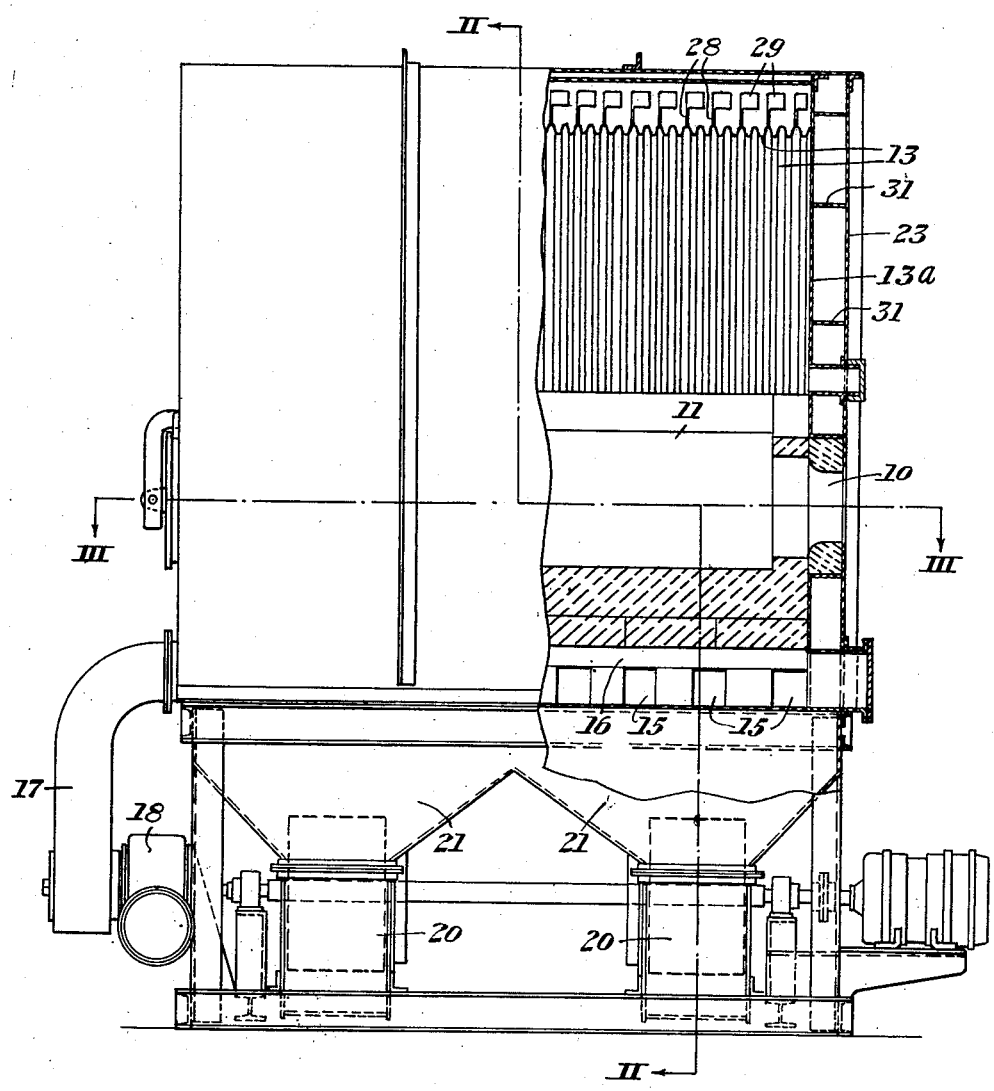
Fig. 1 is a view in side elevation of one construction of apparatus embodying my invention, parts being broken away to illustrate the interior arrangement of the heating furnace.

One embodiment which illustrates my invention is shown in Figs. 1–3 inclusive. While it is in general unimportant, so far as my invention is concerned, whether oil, coke, coal, or some other type of fuel be employed in the heating furnace, for the sake of clearness it should be noted that the apparatus shown in Figs. 1 to 3 is designed particularly for combustion of gas or fuel oil, the burner inlet being shown at 10. The firebox 11 extends lengthwise of the heating furnace so as to be heated to a high temperature by the flame. This heat is radiated to the casing 13 which extends as an arched wall over the firebox 11, the axis of the arch extending lengthwise of the firebox. As is apparent from Fig. 2, the casing 13 is in cross section an inverted U, whose legs extend downwardly outside the firebox 11. Ducts 15 extend inwardly from both lateral spaces between the firebox 11 and casing 13 to suck the gaseous products of combustion into the central longitudinal flue 16 which leads to an exhaust pipe 17 connected to an exhaust fan 18 (see Fig. 1). The ducts 15 may, if desired, be provided with dampers for controlling the flow of gases therethrough so as to ensure a uniform distribution and flow of hot gases down along the entire inner surface of the casing 13 for uniformly heating the same. For factories and other buildings requiring a large and steady output of hot air, it is preferable to accurately dimension the ducts 15 when the apparatus is built, so as to ensure uniform withdrawal of hot gases through the several ducts into the flue 16 without the use of dampers.

The effect, then, of the combustion of the fuel introduced into the heating furnace is to highly heat the firebox 11 and to cause the gaseous products of combustion as they rise from the firebox to be drawn down, as indicated by the arrows, between the outer walls of the firebox and the inner surface of the casing 13. There is only a narrow space here between the walls of the firebox and the heat transfer walls provided by the casing 13, so that the waste gases are moving in intimate wiping contact with heat transfer walls and must give up the greater part of their sensible heat thereto. The heat radiated from the flame and from the interior of the firebox 11 is of particular importance in heating the dome of the casing 13. Because of the importance of this radiated heat, I have provided a maximum surface, herein embodied as the interior surface of the casing 13, which is in direct heat absorbing relation to the radiant flame and to the radiating interior of the firebox 11. It is advantageous, therefore, that the sides of the firebox should not extend upwardly so as to shade the sides of the arch and decrease the effectiveness of the casing 13 in absorbing the directly radiated heat.

The present invention is particularly related to the transfer of heat from the exterior of the casing 13 to the air which is to be delivered hot from the apparatus. The cost of the installation would be so large as to make its operation uneconomical if natural circulation of the air were relied upon. Instead, I pass air rapidly in wiping contact with the exterior of the casing 13, using a blower for this purpose. Even where the outlet is at the top of the apparatus, as in the other two embodiments, I provide a blower or the like for causing rapid flow of air.

In the form of apparatus shown in Figs. 1, 2 and 3, the blowers 20 are beneath the heating furnace and force the incoming air through spreaders 21 to the bottom of the narrow space on one side of the heating furnace between the casing 13 and the outer sheathing 23 of the apparatus. The spreaders 21 are so designed as to cause the blown air to spread out into a uniform thin stream rapidly flowing upwardly in the space between the casing 13 and the sheathing 23; and this air, in distributed condition, flows rapidly along the outside of the heat transfer surface in the manner illustrated by the arrows in Fig. 2. The space between the outer sheathing 23 and the heat transfer surface is such as to maintain the air in intimate wiping contact with the heat transfer surface and in a comparatively thin layer, whereby the air during its passage upwardly and over the top of the dome and down the other side of the heating furnace readily absorbs heat from the casing 13. Thereafter, the heated air is discharged through the outlets 25. A plurality of outlets may be used, if desired; and they may be directed in various directions so as to distribute the heated air as desired. Vanes 26 are of assistance in directing the discharging air.

I have found it of advantage to corrugate the walls 13 so as to increase the heat exchange surface available for transferring the heat from the burning fuel to the air. As the sheathing 23 conforms in general to the inverted U-shape of the casing 13, the air being heated is kept in intimate contact with the outer surface of the arched casing 13. This effect can be augmented by attaching fins 28 to the exterior of the casing 13. Baffles 29 carried on the outer edges of these fins 28 have outwardly turned ends facing toward the stream, so as to set up turbulence in the flow and cause the cooler outer air to be diverted inwardly into wiping contact with the heat exchange surface. These baffles 29 are a refinement of the heat exchange surface, but are not essential, as I obtain remarkably high efficiency in the exchange of heat between the heating furnace and the air merely by the use of corrugations in the wall 13.

The upper or arched portion of the casing 13 which is more directly exposed to the radiant heat from the flame and firebox will, as a general rule, be heated to a higher temperature than the remainder of this casing: in fact, the temperature of this portion of the casing will generally rise high enough so that a substantial amount of heat is sent out therefrom as radiant heat. I accordingly extend an adsorption surface 30 over this portion of the casing 13 outside of the fins 28 and baffles 29. This adsorption surface or black wall need not be of expensive material, but may be merely a thin steel plate secured to the underside of the sheathing 23. This plate 30 should preferably not have a bright polished reflecting surface such as a cold-rolled strip, but should have the dull dark surface of ordinary steel sheets.

The front and rear ends of the heating furnace are closed by metal plates 13a and 13b respectively. The spreaders 21 extend far enough to the front and rear to force air into the spaces between the plates 13a and 13b and the outer sheathing 23. Due to the arched or inverted U-shape of the sheathing, there is a tendency for this air at the ends of the heating furnace to take an arcuate path beneath this arch and flow downwardly to the outlets on the other side of the apparatus. The deflecting of the air so as to follow this curved path is assisted by arcuate or arched baffles 31 disposed between the plates 13a and 13b and the sheathing 23.

From the foregoing description, it will be apparent that the heat exchange surface exposed by the casing 13 affords a maximum area for the transfer of heat to the air circulating thereover, and that the casing 13 in turn is in direct heat absorbing relationship to the source of heat disposed therein, so that it absorbs heat not only by absorption from the heated products of combustion, but by radiation from the source of heat.

In the second form of apparatus, as illustrated in Figs. 4 and 5, the firebox 32 is substantially similar to the one shown at 11 in Figs. 1 and 2. The corrugated casing 33 is likewise substantially similar to the one shown in Figs. 1 to 3 inclusive. Instead of a single central flue, such as shown at 16, I provide in this form of the invention two lateral flues 35 beneath the firebox 32 which lead to vertical breechings 36 leading through a connection 37 to an exhaust fan 38.

The gaseous products of combustion moving upwardly from the firebox 32 pass downwardly in close contact with the inner surfaces of the corrugated walls of the casing 33 and between the legs of the inverted U of this casing and the firebox walls. Adjacent the bottom of the casing 33, the gaseous combustion products enter the flues 35 through a number of passageways 40 distributed along the firebox (see Fig. 4). As mentioned above in connection with the first embodiment, dampers may be employed for controlling discharge through these passageways into the flues 35; but for the most economical maintenance of this apparatus, it is more desirable to design and permanently construct these passageways so as to bring about a uniform distribution of the flow of the hot gases down along the inner surface of the corrugated walls of the casing 33.

The outer sheathing 41 receives the air to be heated through gratings 42 about the bottom of the apparatus; and due to the restricted space between the corrugated casing 33 and the outer sheathing 41, the air is caused to flow upwardly in thinly spread-out condition, and in intimate wiping contact with the heat exchange surface. The inlets 42 for the air admit the air evenly to the above-mentioned space between the casing 33 and the sheathing 41, so as to cause the desirable uniform distribution of the air along the length of the heating furnace.

A superstructure on which is mounted the exhaust fans and the driving motor therefor is carried by end frames 43a and 43b disposed between the end plates 33a and 33b at the front and rear respectively of the heating furnaces and the outer sheathing 41. The gratings 42 extend across the front and rear of the apparatus so that air enters between the plates 33a and 33b and the sheathing 41 and rises in these spaces. Flow openings are provided (as indicated in Fig. 4 of the drawings) through the end frames themselves by cutting out baffles 43c from the metal of the end frames and bending these baffles upwardly so as to deflect the rising air through the flow openings.

The air is caused to flow rapidly over the corrugated surface 33 and over the end plates 33a and 33b by exhaust fans 44 driven by a motor 45. The exhaust fan 38 may be driven from this same motor or from a different prime mover. In this embodiment, the air to be heated rises along both legs of the inverted U and flows upwardly from the top of the dome through the fan housing so as to be discharged therefrom at the top of the apparatus. A plate 46 may be extended over the arched portion of the casing 33 to provide a black wall or adsorption surface similar to that indicated at 30 in Fig. 2. This plate may be of the same material suggested for the plate 30, but I prefer to shape it and form an opening therein at the top so as to direct the air into the fan housing. It is generally desirable to direct the outlets 47 from the fans to the side so as to spread the heated air out across the room; but one fan is, as shown, directed upwardly.

The corrugated casings are shown both in the second embodiment and in the third embodiment without fins such as shown at 28 in the first embodiment. It is within the contemplation of my invention that the inner casing of the heating furnace of both the second embodiment and of the third embodiment of my invention may be provided with fins or with fins and baffles of the character disclosed in Figs. 1, 2 and 3 for increasing the rate of heat transfer.

Figure 8:
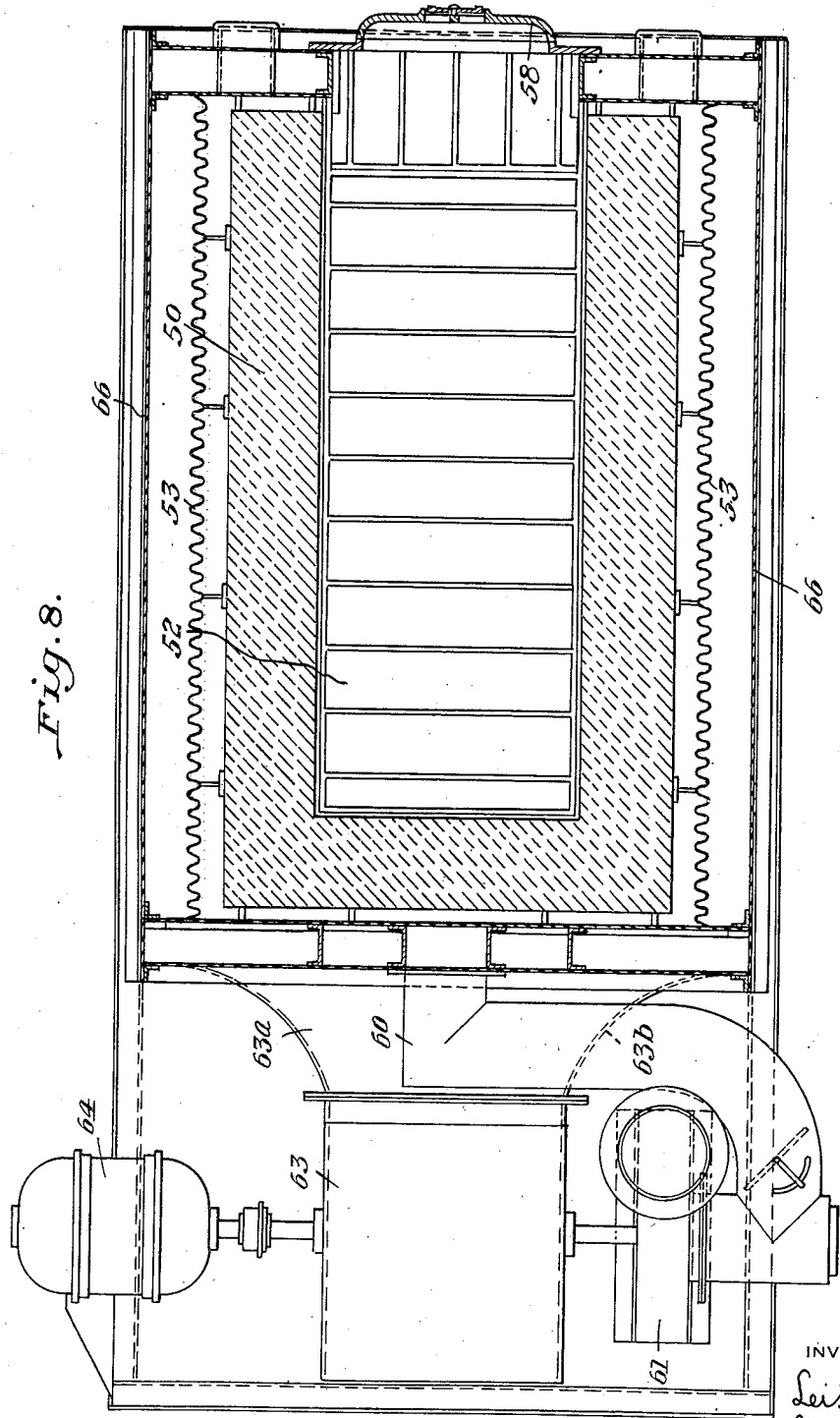
Fig. 8 is an enlarged horizontal section taken on the line VIII—VIII of Figs. 6 and 7.

In the third form of apparatus shown in Figs. 6, 7 and 8, the firebox 50 is designed for the combustion of coal, coke or the like. The height of the side walls of the firebox is reduced to a minimum in accordance with my teaching that a maximum surface should be provided effective as a direct radiant heat absorbing surface with respect to the fuel bed. Note in this connection that the upper inner corners of the firebox 50 are beveled as shown at 51 to reduce to a minimum the screening effect of the firebox with respect to the radiation of heat from the fuel bed. The grate 52 upon which the fuel bed is supported is conventionally indicated in Fig. 6.

The casing 53 is corrugated as in the forms shown in Figs. 1 to 5, and is in general substantially similar to the casings shown in the other two embodiments of the invention. The two legs of the inverted U are, as in the other embodiments, slightly spaced from the firebox; and spacers 55 may be provided between the casing and firebox for positioning the casing. The gaseous products of combustion which rise from the fuel bed turn downwardly and are drawn in intimate contact with the inner surface of the casing 53 through the spaces between the firebox 50 and the casing 53. If desired, dampers may be provided in the spaces between the firebox and the casing so as to insure that the distribution of the flow is uniform lengthwise of the heating furnace; but as in the other embodiments, these dampers are preferably omitted, and instead the spaces are accurately dimensioned to provide the desired distribution of flow. The ash-pit beneath the firebox causes the gaseous combustion products drawn downwardly on either side thereof to flow longitudinally of the firebox in the spaces 56. At the end of the ash-pit remote from the fuel door 58 is provided a cross passageway 59 or breeching which receives the flue gases from the two spaces 56 and delivers them through a conduit 60 (see Figs. 6 and 8) to the exhaust fan 61. (In all three forms of the apparatus the flue to which the exhaust fan delivers the flue gases is omitted since it forms no part of my invention.)

The air which is to be heated is forced into the apparatus by a blower 63 driven by a motor 64; and is divided into two streams 63a and 63b which are led to the sides respectively as well as to the ends of the apparatus. Each stream flows along a space 64 (see Fig. 7) to one side of the ash-pit, and beneath the space 56. From the spaces 64 the air flows rapidly upwardly between the casing 53 and the outer sheathing 66. As the casing 53 is corrugated, a maximum area of heat exchange surface is provided, the rising air wiping the heat from the surfaces with which it contacts. An outlet 67 extending the length of the top of the apparatus delivers the heated air, it being within the contemplation of my invention that a duct may be used to convey the heated air from the outlet 67 to any desired location which is to be heated.

The several embodiments of my invention have the advantages in common of affording a maximum area of surface in direct absorbing relation to heat radiated from the firebox. This surface is particularly efficient in absorbing radiated heat because its temperature is never permitted to become elevated as air is caused to flow rapidly in wiping contact with the exterior of the casing. This flowing air is distributed uniformly over the exterior surface of the corrugated casing so that heat is rapidly and uniformly extracted by the wiping contact of the air with the exterior surface. Also the gases given off in the course of combustion give up a maximum proportion of their sensible heat to the air, since these products of combustion flow downwardly along the confined space left between the firebox and the legs of the inverted U of the casing. The gases drawn beneath the firebox are accordingly reduced in temperature by the time they reach the exhaust fan; and in general the temperature of the gases delivered from the exhaust fan is not over about 500° F.

To those skilled in the art it will be apparent that all of the forms of my invention provide for the maximum transfer of heat by reason of the corrugated heat transfer surface and the confined circulation of air on one side of said surface together with the controlled circulation of the products of combustion on the opposite side of such surface. By properly disposing the sources of heat within the chambers, a more nearly uniform distribution of heat is obtained therein, thus giving a more nearly uniform rate of heat transfer throughout the heat transfer surface. It will also be understood that by reason of the direction of extension of the corrugations, they serve as air flues on one side, and flues for products of combustion on the other side, thereby assisting in the desired directional circulation of these media.

Other advantages of the invention arise from the simplicity of the construction, all of the parts being readily formed from more or less easily procurable shapes, and easily assembled to produce the desired furnace structure.

While I have herein illustrated and described certain preferred embodiments of the invention, it will be understood that changes in the construction, arrangement and disposition of the parts may be made without departing either from the spirit of the invention or the scope of my broader claims.

I claim:

1. Apparatus for circulating and heating air comprising a combustion chamber having an elongated heat-exchange casing of inverted U-shape in cross section, an exhaust passage for drawing gaseous products of combustion down along the inside of said casing, a blower below said chamber, an outer U-shaped sheathing cooperating with said casing, an air inlet extending along one side of the casing adjacent its bottom for admitting air from the blower between the casing and sheathing so as to pass up said one side, over the top and down the other side of said chamber, said outer sheathing following generally the contour of the casing, an air outlet adjacent the bottom of said other side, and means for uniformly distributing the flow of air over said casing.

2. Apparatus for circulating and heating air comprising a heating furnace provided with an arched corrugated casing with the corrugations extending up over the arch thereof, means including an exhaust passage beneath the furnace for drawing gaseous products of combustion down along the inside of said corrugated casing, an outer arched casing cooperating with said first-mentioned casing to provide an air flow space, a blower for delivering air at one side of said furnace to the lower portion of said space for flow up over the arch of said heat-exchange surface and down the other side, and an air outlet adjacent the bottom of said other side, said outer casing conforming generally to the contour of the inner casing and lying in such proximity thereto as to confine the air to a relatively shallow stream.

3. An air heating furnace comprising a casing generally inverted U-shaped in section defining a combustion chamber, a fire box within the lower portion of said casing and having side walls adjacent to but uniformly spaced from the side walls of said casing to provide a thin restricted passage for heating gases on either side of said furnace, duct means below said fire box and connected with said passages throughout the length thereof, thereby insuring uniform flow in said passages, an outer casing for said furnace adjacent to but uniformly spaced from said first mentioned casing providing a passage for a thin blanket of air on either of the sides of said furnace, an air inlet extending throughout the length of at least one of said last mentioned passages, an air outlet extending throughout the length of said last mentioned passages, means to supply a uniform draft to said duct means, and means to force a uniform volume of air through said last mentioned passages.

4. An air heating furnace comprising a casing generally inverted U-shaped in section defining a combustion chamber, a fire box within the lower portion of said casing and having side walls adjacent to but uniformly spaced from the side walls of said casing to provide a thin restricted passage for heating gases on either side of said furnace, duct means below said fire box and connected with said passages throughout the length thereof, thereby insuring uniform flow in said passages, an outer casing for said furnace adjacent to but uniformly spaced from said first mentioned casing providing a passage for a thin blanket of air on either of the sides of said furnace, an air inlet extending throughout the length of at least one of said last mentioned passages, an air outlet extending throughout the length of said last mentioned passages, said first mentioned casing being corrugated to provide troughs running in the direction of flow of the heating gases and air whereby the gases flow between the side walls of said fire box and said first mentioned casing and the air flowing between said inlet and outlet will be caused to flow in parallel strata, means to supply uniform draft to said duct means and means to force a uniform volume of air through said last mentioned passages.

5. A furnace according to claim 4 further characterized by the said duct means being wholly within said first mentioned casing.

LEIF LEE.